US011878949B1

United States Patent
Zhu et al.

(10) Patent No.: US 11,878,949 B1
(45) Date of Patent: Jan. 23, 2024

(54) MULTI-COMPONENT HIGH STABILITY ENVIRONMENTAL BARRIER COATINGS

(71) Applicant: United States of Americas as represented by the Administrator of NASA, Washington, DC (US)

(72) Inventors: Dongming Zhu, Westlake, OH (US); Bryan J. Harder, Bay Village, OH (US); Janet B. Hurst, Columbia Station, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 1182 days.

(21) Appl. No.: 15/882,435

(22) Filed: Jan. 29, 2018

Related U.S. Application Data

(60) Provisional application No. 62/451,145, filed on Jan. 27, 2017.

(51) Int. Cl.
| | |
|---|---|
| *C04B 41/52* | (2006.01) |
| *C04B 41/87* | (2006.01) |
| *C04B 41/89* | (2006.01) |
| *F01D 25/00* | (2006.01) |

(52) U.S. Cl.
CPC .............. *C04B 41/87* (2013.01); *C04B 41/89* (2013.01); *F01D 25/005* (2013.01); *F05D 2220/32* (2013.01); *F05D 2300/608* (2013.01); *F05D 2300/6033* (2013.01); *F05D 2300/611* (2013.01)

(58) Field of Classification Search
CPC ............... C04B 41/5024; C04B 41/522; F05D 2220/32
See application file for complete search history.

(56) References Cited

PUBLICATIONS

Kramer et al., Infiltration-Inhibiting Reaction of Gadolinium Zirconate Thermal Barrier Coatings with CMAS Melts, Jan. 17, 2008, Journal of the AMerican Chemical Society, vol. 91, Issue Feb. 2, 2008, pp. 576-583. (Year: 2008).*

* cited by examiner

*Primary Examiner* — Adam Krupicka
(74) *Attorney, Agent, or Firm* — Robert H. Earp, III; Mark Wolfgang; Trenton J. Roche

(57) ABSTRACT

An advanced high temperature environmental barrier coating system is disclosed for protecting Si-based ceramics and SiC/SiC ceramic matrix composites (CMCs). This innovation provides a series of environmental barrier coating composition systems to achieve exceptional temperature capability, erosion and calcium-magnesium-aluminosilicate (CMAS) resistance and durability of the environmental barrier coated ceramic turbine engine hot-section components, in harsh turbine engine environments. The environmental barrier coating systems have been demonstrated for 1650° C. temperature capability and help prime-reliant designs.

15 Claims, 10 Drawing Sheets

MULTI-COMPONENT HIGH STABILITY ENVIRONMENTAL BARRIER COATINGS

CROSS-REFERENCE TO RELATED APPLICATIONS

This application claims the benefit of U.S. Provisional Patent Application Ser. No. 62/451,145 entitled "Multi-Component High Stability Environmental Barrier Coatings for SiC/SiC Ceramic Matrix Composites" filed on Jan. 27, 2017, the entirety of which is incorporated by reference herein.

ORIGIN OF THE INVENTION

The invention described herein was made by employees of the United States Government and may be manufactured and used only by or for the Government for Government purposes without the payment of any royalties thereon or therefore.

TECHNICAL FIELD

An advanced high temperature environmental barrier coating (EBC) system is disclosed. In particular the EBC system may be used to protect Si-based ceramics and SiC/SiC ceramic matrix composites (CMCs).

BACKGROUND

Environmental barrier coating (EBC) systems are ceramic coating systems, generally applied by air or low pressure plasma spraying and/or physical vapor deposition methods, including plasma spray, electron beam-physical vapor deposition (EB-PVD), or plasma-spray physical vapor deposition (PS-PVD), chemical vapor deposition, laser vapor and atomic layer deposition, slurry and polymer derived coating methods.

The ever-increasing turbine engine operating temperatures and pressures for next generation jet engines require the ceramic turbine hot-section components to be operated at 2700-3000° F. (or 1482-1650° C.). There remains a need for EBC systems capable of operating at high temperatures that maintain acceptable environmental stability and mechanical strength for long-term durability for high temperature turbine engine applications.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The current state of the art thermal barrier coating is $ZrO_2$-(7-8)wt%$Y_2O_3$. Currently available environmental barrier coating systems include barium and strontium-aluminosilicate (BSAS), mullite, and rare earth (RE) silicates, which has showed major degradation in turbine engine harsh operating environments.

These coatings will not have higher sufficient temperature capabilities in advanced turbine engine environments. In particular, although the EBCs such as rare earth mono-silicates and di-silicates (the line compounds) may have high enough melting points, these melting points may be significantly reduced in the presence of minor impurities and reactions with the coating layers that could result in the corrosion or leaching out the rare earth dopants. The corrosion or leaching out of the rare earth dopants could cause melting and fast erosion in damaging environments such as sand and CMAS erosion-reaction containing environments and under engine high heat flux and cycling conditions.

The single rare earth element silicates (di-silicates and mono-silicates) do not have sufficient high temperature phase stability, environmental stability, and mechanical strengths for long-term durability for the envisioned high temperature turbine engine applications.

According to an aspect, the innovation may comprise an advanced multicomponent (e.g., rare earth based, hafnium doped silicate), multiphase environmental barrier coating composition system having significantly improved temperature capability and durability in the engine combustion and water vapor, CMAS and sand erosion environments.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
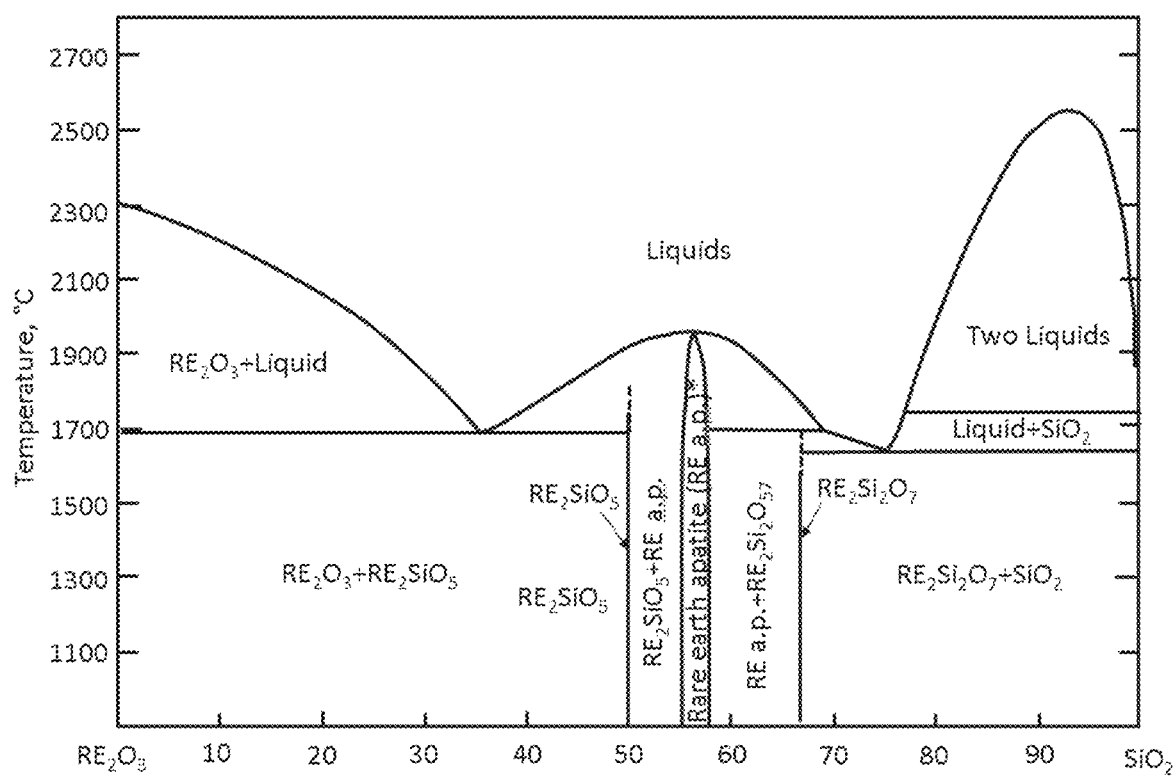
FIG. 1 is a phase diagram of multicomponent EBCs according to embodiments of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

The EBC composites according to the innovation provide superior thermal, thermomechanical and environmental stability of the novel multi-component rare earth silicate environmental barrier coatings, helping the coatings resistance in the combined high temperature heat flux, thermomechanical fatigue, and impact, erosion, and calcium magnesium alumino-silicate (CMAS) and combustion environments.

According to an aspect, the innovation may comprise an advanced multicomponent (e.g., rare earth based, hafnium doped silicate), multiphase environmental barrier coating composition system having significantly improved temperature capability and durability in the engine combustion and water vapor, CMAS and sand erosion environments.

In one embodiment, the environmental barrier coating system disclosed in this invention comprises multi-component, rare earth silicate based constituents.

In one embodiment, the innovation may include an EBC composition that is a primary rare earth element based lower expansion EBC. The EBC may include rare earth silicates, such as ytterbium, lutetium or yttrium, scandium rare earth metal silicates that typically have smaller cation radii, and phase stability for the primary EBC constituent.

In one embodiment, the innovation may include an EBC composition that is based on small ionic sized rare earth silicates co-doped with larger rare earth ionic radius elements, namely, gadolinium (Gd), neodymium (Nd), lanthanum (La), samarium(Sm). The EBC composition according to the innovation may facilitate significantly higher stability at high temperature by promoting single phase rare earth apatite phase, or nanocrystalline mixed silicate-type oxyapatite composite rare earth silicate phases through the various ion solute or defect cluster segregations, and micro-domain rare earth oxyapatite silicate composition designs.

The simultaneous presence of the larger ionic radius rare earth dopants (or cluster silicate dopants, such as Gd, Nd, La, and Sm), and the smaller ionic size rare earth dopants, will promote highly stable low diffusion oxide-silicate defect cluster structures, as described in U.S. Pat. No. 7,740,960 and U.S. Patent Pub. No. 2013/0344319, both of which are hereby incorporated in their entireties.

The multicomponent single-phased and multi-phased environmental barrier coatings can also be doped with Zr and Hf. The Zr and Hf dopants can be incorporated into the multi-scale level, rare earth silicate structures and its grain boundaries to further enhance the silicate coating stability, reduce diffusion, grain growth, and combustion environmental stability (when particularly reducing the surface and boundary $SiO_2$ activities, and when forming nano-multi-phase domains such as facilitating the rare earth zirconate pyrochlore and cubic fluoride oxide phase formations at segregated nano-sized cluster regions, in addition to the silicate dominant phases).

Another unexpected advantage of the clustered rare earth silicate EBCs according to the innovation, are that the large ionic sized rare earth (e.g., Gd, Nd, La, Sm) have similar ionic sizes to that of calcium, which is a key element component in CMAS (i.e., calcium magnesium alumino-silicate road sands) or volcanic ash compositions. These cluster rare earth silicate dopants, once segregated in the designed silicate internal lattice defect locations and grain boundaries, will help stabilize the high temperature capable apatite phases within the silicate EBCs throughout a large temperature range without the need of incorporation of calcium or magnesium elements. The larger ionic sized cluster rare earth silicate dopants will also significantly improve the CMAS resistance because of the formation of the higher melting point rare earth oxyapatite phases within the EBCs and at the EBC/CMAS interfaces.

In one embodiment, the innovation includes rare earth silicate cluster environmental barrier coating compositions comprising the majority phases of the small rare earth di-silicates and mono-silicates, by co-doping with large rare earth metal (Gd, Nd, La, Sm) silicates to facilitate the silicate composition clustering, and multi-scale and multi-level oxyapatite phase formation, and by co-doping with $ZrO_2$ and $HfO_2$ to facilitate the oxide-silicate composition clustering, and, thus, the pyrochlore and fluorite phase formation. The rare earth silicate, oxyapatite-silicate and oxide phase fractions and distributions can be effectively controlled, mostly benefits in the grain boundaries and cluster or line defects so effective melting pint of the EBCs can be increased, thermomechanical and environmental stability can be improved.

In one embodiment, the coating rare earth silicate compositions may comprises a Group A rare earth element mono- or di-silicate, including ytterbium, lutetium, yttrium or scandium and combination thereof; and the Group B rare earth element mono- or di- or oxyapatite silicates, which comprise gadolinium (Gd), neodymium (Nd), lanthanum (La), samarium(Sm) or a combination thereof. The Group A and Group B silicates form highly stable solid solutions, but with controlled multi-scale micro- or nano-domain segregations.

In one embodiment, Group A rare earth silicate composition comprises from about 50 to about 99.5 molar percent, while the Group B composition comprises about 0.5 to about 50 molar percent.

In another embodiment, erbium, europium, terbium, dysprosium, holmium silicates can be combined into Group A to forming mono- or di-silicates and for stabilizing oxyapatite rare earth silicates.

In one embodiment, the environmental barrier coating systems a hafnium or zirconium dopant can also be incorporated.

In one embodiment, the composition according to the innovation may include Group A small sized rare earth silicates (see above, such as ytterbium silicate $Yb_2Si_2O_7$ and $Yb_2SiO_5$, lutetium silicates $Lu_2Si_2O_7$, and $Lu_2SiO_5$ including yttrium silicates $Y_2Si_2O_7$ and $Y_2SiO_5$) and any combination thereof: about 30-75 molar percent; Group B large sized rare earth silicates (see above, such as $Gd_2Si_2O_7$, $Gd_2SiO_5$; $Nd_2Si_2O_7$, $Nd_2SiO_5$) and any combination thereof: about 2.5-25 molar percent; hafnium silicate $HfSi_{1-x}O_{4-y}$, and/or zirconium silicate $ZrSi_{1-x}O_{4-y}$.

In another embodiment, the environmental barrier coating can be functionally graded with the rare earth content increasing, silica content decreasing when towards the coating surface to further enhance the temperature capabilities.

The coatings have been developed and tested in various test rigs and environments. The testing so far has included long-term laboratory high heat flux mechanical creep and fatigue tests up to 500-1000 hours; sub-element and component tests in the high heat flux and in high pressure burner rigs; high heat flux steam tests, and CMAS simulated engine tests.

The coatings have demonstrated 2700° F-3000° F. long-term high heat flux capability, and also showing superior CMAS resistance in the laboratory test rigs.

Figure 9:
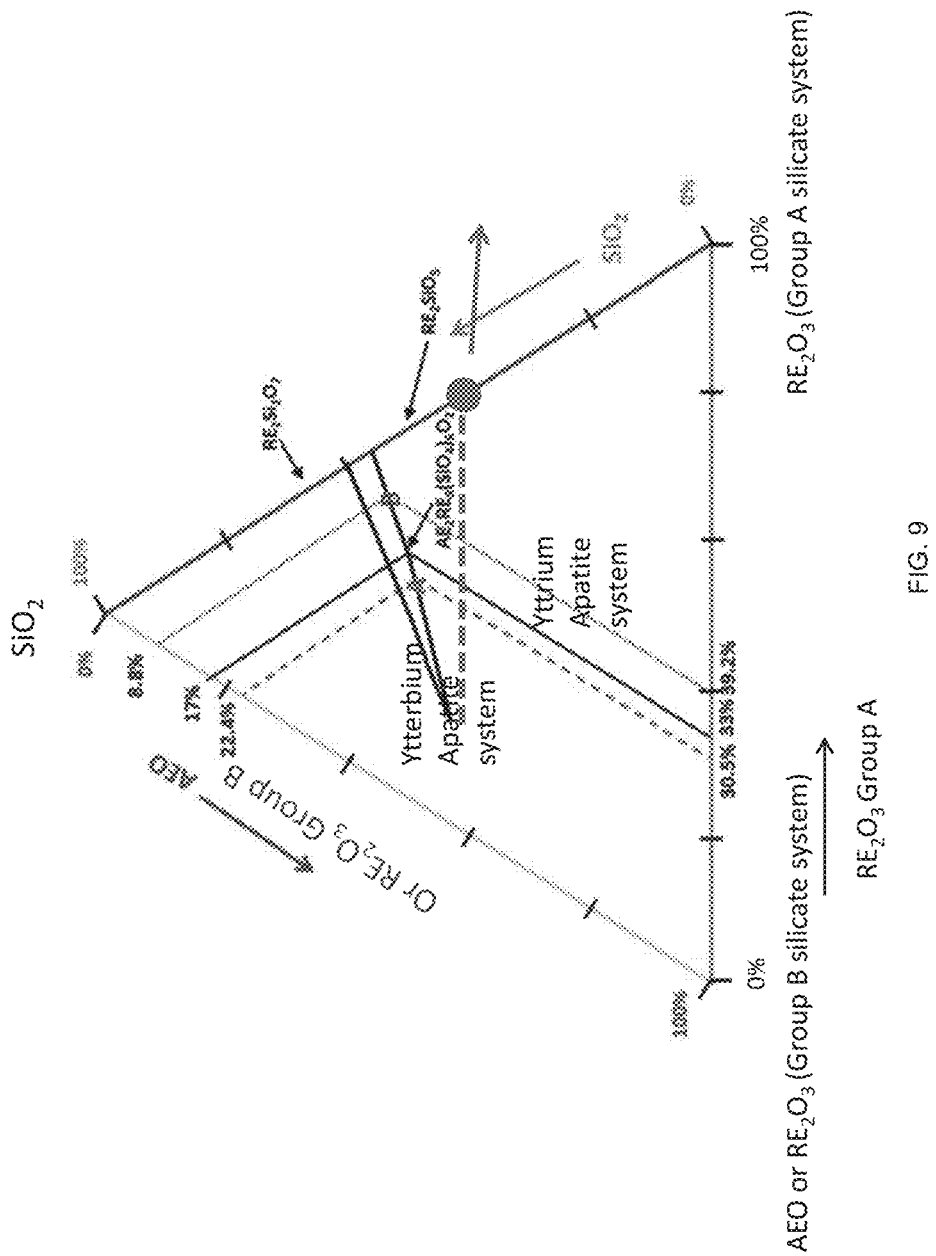
FIG. 9 is an alkaline earth oxide (AEO), ($RE_2O_3$ Group A)—$RE_2O_3$ Group B-$SIO_2$ phase diagram.
Figure 10:
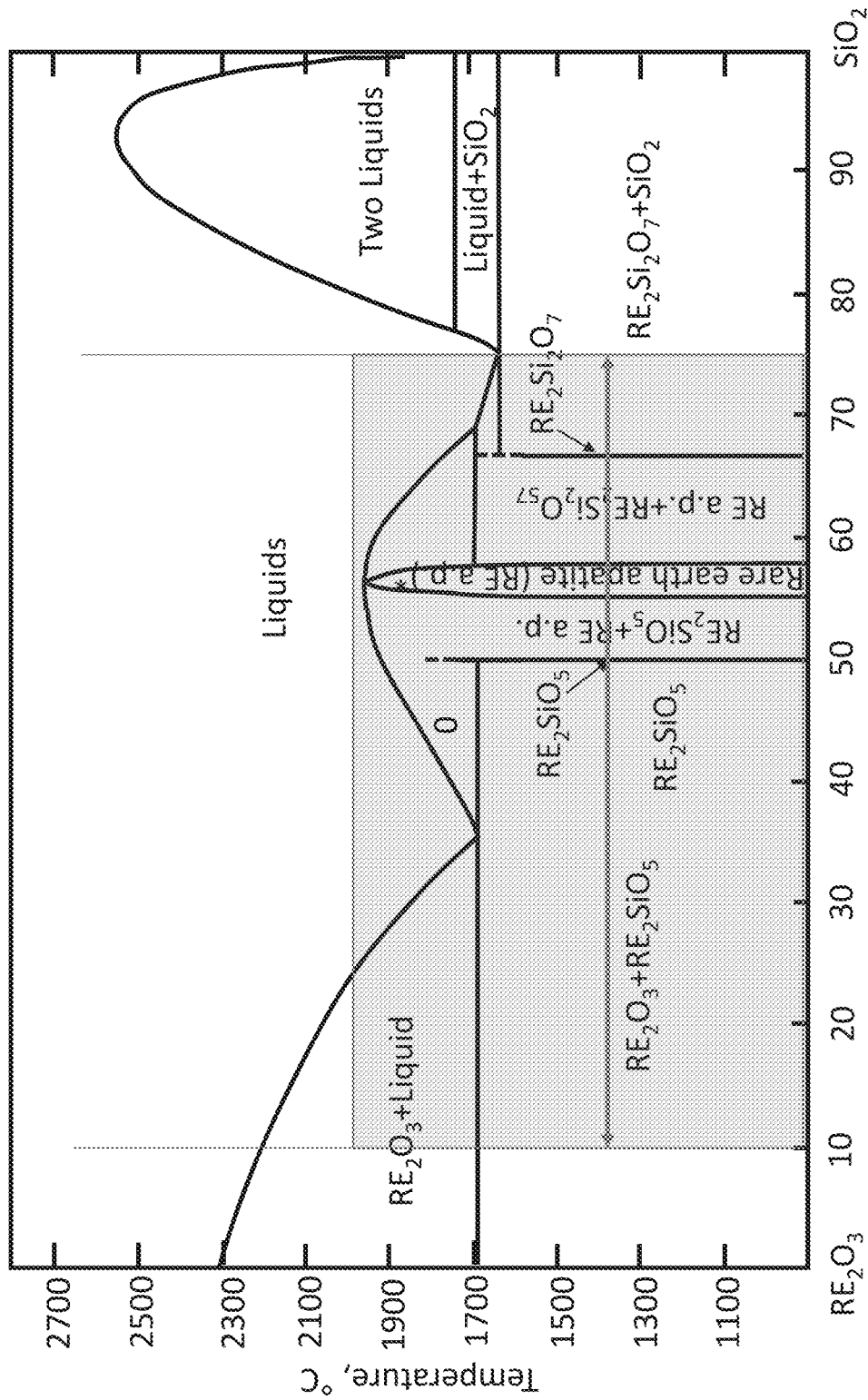
FIG. 10 is a phase diagram of multicomponent EBCs according to embodiments of the innovation.

As depicted in the phase diagrams of FIGS. 1, 9, and 10, the multicomponent EBCs according to the innovation promote rare earth apatite compositions with higher melting points and higher temperature capabilities compared to rare earth mono-silicates and di-silicates:

In one embodiment, the EBC composition comprises a composition in the range between rare earth silicate composition $REiO_3$-10 mol%$SiO_2$ and $REiO_3$-75 mol%$SiO_2$ (FIG. 10) or ($RE_2O_3$-50 mol%$SiO_2$, or $REiSiO_5$) and rare earth di-silicate ($REiO_3$-66.7 mol%$SiO_2$, or $RE_2Si_2O_7$) (FIG. 1). In one embodiment, the composition may comprise $(Nd,Yb,Gd,Sm)_4Si_6O_{27}$, $(Nd,Yb,Gd,Sm)_{10}Si_6O_{27}$, $Nd_9YbSi_6O_{27}$, $Sm_9YbSi_6O_{27}$, $Gd_9YbSi_6O_{27}$, $La_9YbSi_6O_{27}$, $Gd_{4.33}Yb_{4.33}iSiO_4)_6$(double RE apatite silicates) or the like. In one embodiment, the rare earth apatite may comprise $RE_{10}/(SiO_4)_6O_{2+y}$, such as $RE_{9.3}iSiO_4)_6O_2$, $RE_5/(SiO_4)_3O_2$ such as $RE_{4.67}(SiO_4)_3O_2$ wherein the rare earth (RE) is selected from ytterbium, gadolinium, neodymium, samarium, lutetium, erbium, europium, terbium, dysprosium, holmium, lanthanum, cerium, praseodymium, promethium, thulium (i.e., lanthanides), yttrium, scandium, or a combination of two or more thereof.

As depicted in the phase diagram of FIG. 9, the multicomponent apatite phase may include rare earth content up to 60 molar percent ($RE_2O_3$-40 molar%$SiO_2$), when Group B rare earths is partially or fully replacing alkaline earth oxides. In one embodiment, the composition may include an alkaline earth oxide such as calcium, magnesium, barium, or strontium. As provided herein, however, inclusion of certain rare earth elements (e.g., Group B, described below) may reduce or eliminate the need for alkaline earth oxides to stabilize the apatite structures.

Figure 2:
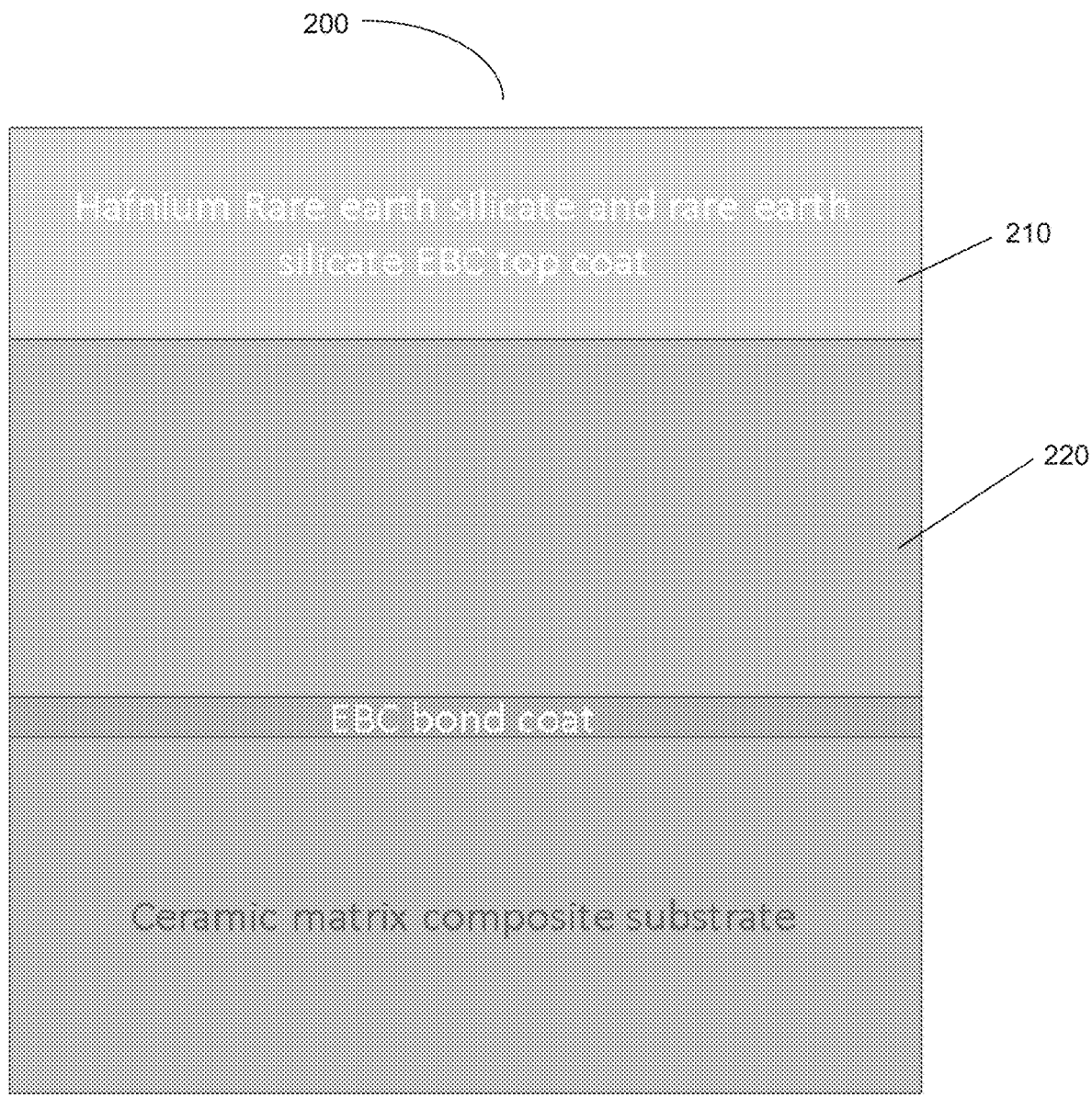
FIG. 2 is a diagram of a multicomponent EBC based on rare earth apatite based compositions according to an embodiment of the innovation.

In one embodiment, the composition is a multicomponent EBC that comprises a rare earth based composition. As depicted in FIG. 2, the multicomponent EBC 200 may include a top coat 210 comprising a multicomponent $(Hf,RE)_2Si_{2-x}O_{7-2x}$ top coat; a second EBC layer 220 comprising multicomponent rare earth apatite based compositions for EBCs for improved temperature capability and CMAS resistance as provided in FIG. 1. The second layer may comprise one or both of two composition categories, referred to herein as Group A and Group B, and any combination of mono- and di-silicates.

Group A components are general smaller and lighter RE ions such as $RE_{4.67}(SiO_4)_3O_2$, and $RE_4(SiO_4)_6$. Group B components are general large and heavy RE ions such as $RE_{10-x}(SiO_4)_6O_{2+y}$. In one embodiment, the multicomponent rare earth apatite based compositions may include RE apatite silicates, or lanthnium apatite silicate compounds with chemical formula $RE_{10-x}(SiO_4)_6O_{2+y}$ such as $RE_{9.3}(SiO_4)_6O_2$, and for lower atomic number rare earths, apatite compounds $RE_{4.67}(SiO_4)_3O_2$, and $RE_4(SiO_4)_6$, $RE_{14}Si_9O_{39}$ (i.e. $7RE_2O_3$-9$SiO_2$), $RE_5(SiO_4)_3N$. In one embodiment, the EBC may further include an EBC bond coat and a ceramic matrix composite substrate.

Figure 3:
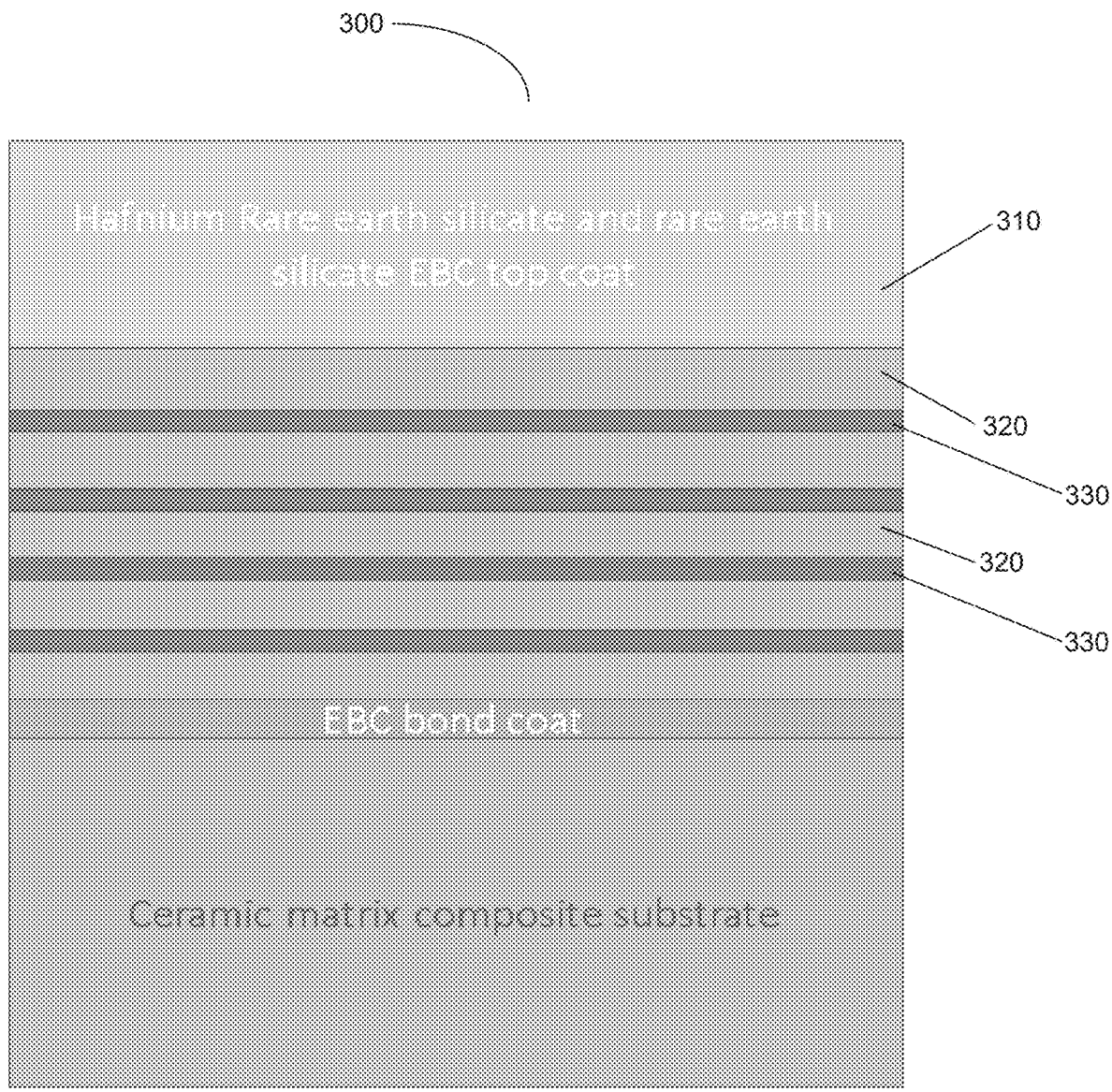
FIG. 3 is a diagram of a multicomponent EBC based on rare earth apatite based compositions according to an embodiment of the innovation.

In one embodiment, the multicomponent EBC may be an alternating layered multicomponent EBCs (with alternating RE Apatite and rare earth silicate layers) for improved temperature capability, stability and CMAS resistance. Each layer may have a thickness between about 0.5 to about 20 micrometers. FIG. 3 depicts an embodiment of an alternating layered multicomponent EBC 300 according to the innovation. The top coat 310 may comprise a multicomponent $(Hf,RE)_2Si_{2-x}O_{7-2x}$. The second EBC layer 320 comprises alternating layers of a multicomponent $(Hf,RE)_2Si_{2x}O_{7-2x}$ layer and a multicomponent RE apatite layer 330 comprising the formula $RE_{9.33}(SiO_4)_6O_2$ or $RE_{4.67}(SiO_4)_3O_2$. In one embodiment, the multicomponent rare earth apatite based compositions may include RE Apatite silicates, or lanthnium apatite silicate compounds with chemical formula $RE_{10-x}(SiO_4)_6O_{2+y}$ such as $RE_{9.33}(SiO_4)_6O_2$, and for lower atomic number rare earths, apatite compounds $RE_{4.67}(SiO_4)_3O_2$, and $RE_4(SiO_4)_6$,$RE_{14}Si_9O_{39}$ (i.e. $7RE_2O_3$-9$SiO_2$). Non-stoichietric doping can incorporate multicomponent rare earth oxide contents to significantly higher $RE_2O_3$:$SiO_2$ ratios in the Apatite compositions. In one embodiment, the EBC may further include an EBC bond coat and a ceramic matrix composite substrate.

Figure 4:
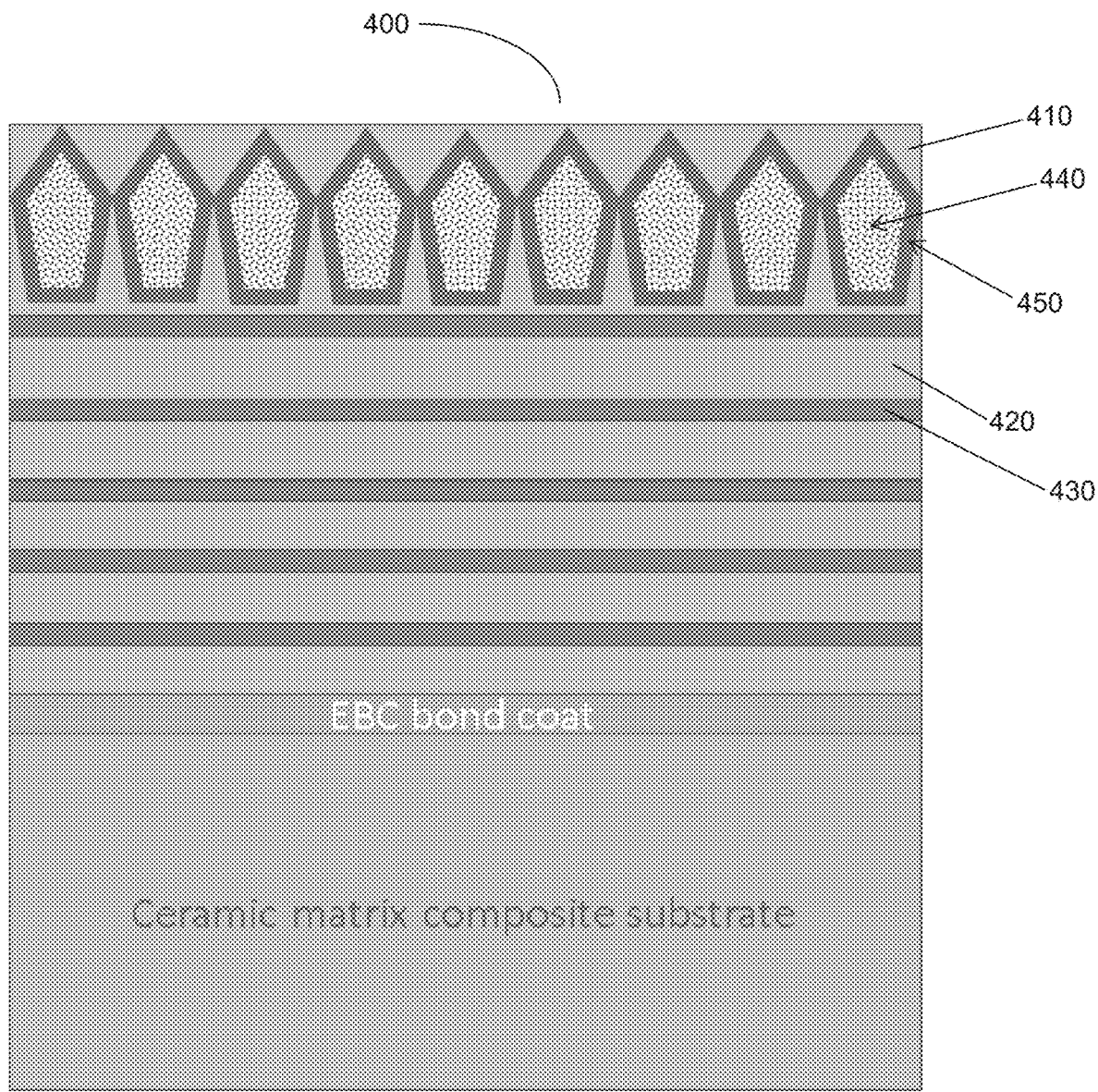
FIG. 4 is a diagram of a multicomponent EBC based on rare earth apatite based compositions according to an embodiment of the innovation.

FIG. 4 depicts an embodiment of an alternating layered multicomponent EBC 400 according to the innovation. FIG. 4 depicts a top coat 410 that includes a multicomponent $(Hf,RE)_2Si_{2-x}O_{7-2x}$. The top coat may include a rare earth silicate component 450 with a multicomponent RE apatite core 440. For EBC matrix for coating high temperature capability, low diffusion and integrity. The multicomponent EBC may further include alternating layers of a multicomponent $RE_2Si_{2-x}O_{7-2x}$ layer 430 and a multicomponent RE Apatite layer 420 having the formula $RE_{9.33}(SiO_4)_6O_2$ or $RE_{4.67}(SiO_4)_3O_2$. In one embodiment, the multicomponent rare earth apatite based compositions may include RE Apatite silicates, or lanthnium apatite silicate compounds with chemical formula $RE_{10-x}(SiO_4)_6O_{2+Y}$ such as $RE_{9.33}(SiO_4)_6O_2$, and for lower atomic number rare earths, apatite compounds $RE_{4.67}(SiO_4)_3O_2$, and $RE_4(SiO_4)_6$,$RE_{14}Si_9O_{39}$ (i.e. $7RE_2O_3$-9$SiO_2$). In one embodiment, the EBC may further include an EBC bond coat and a ceramic matrix composite substrate.

Figure 5:
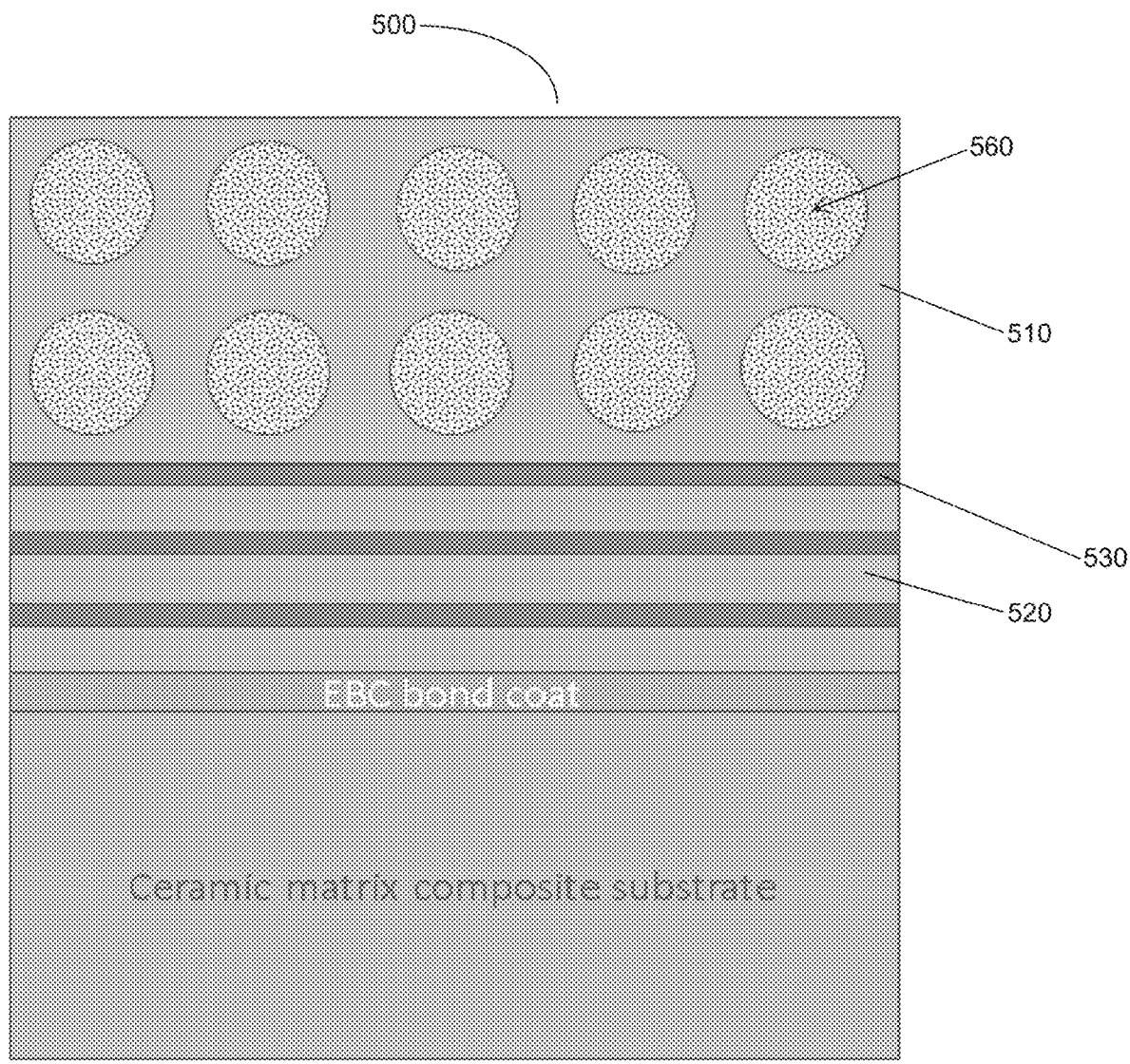
FIG. 5 is a diagram of a multicomponent EBC based on rare earth apatite based compositions according to an embodiment of the innovation.

FIG. 5 depicts an embodiment of an alternating layered multicomponent EBC 500 with alternating RE Apatite layers 520 and rare earth silicate layers 530 for improved temperature capability, stability and CMAS resistance. FIG. 5 depicts an EBC comprising a multicomponent $(Hf,RE)_2Si_{2-x}O_{7-2x}$ EBC top coat 510 with embedded rare earth apatite clusters 560 having the formula $RE_{9.33}(SiO_4)_6O_2$ or $RE_{4.67}(SiO_4)_3O_2$. In one embodiment, the multicomponent rare earth apatite based compositions may include RE Apatite silicates, or lanthnium apatite silicate compounds with chemical formula $RE_{10-x}(SiO_4)_6O_{2+Y}$ such as $RE_{9.33}(SiO_4)_6O_2$, and for lower atomic number rare earths, apatite compounds $RE_{4.67}(SiO_4)_3O_2$, and $RE_4(SiO_4)_6$,$RE_{14}Si_9O_{39}$ (i.e. $7RE_2O_3$-9$SiO_2$). In one embodiment, the EBC may further include an EBC bond coat and a ceramic matrix composite substrate.

Figure 6:
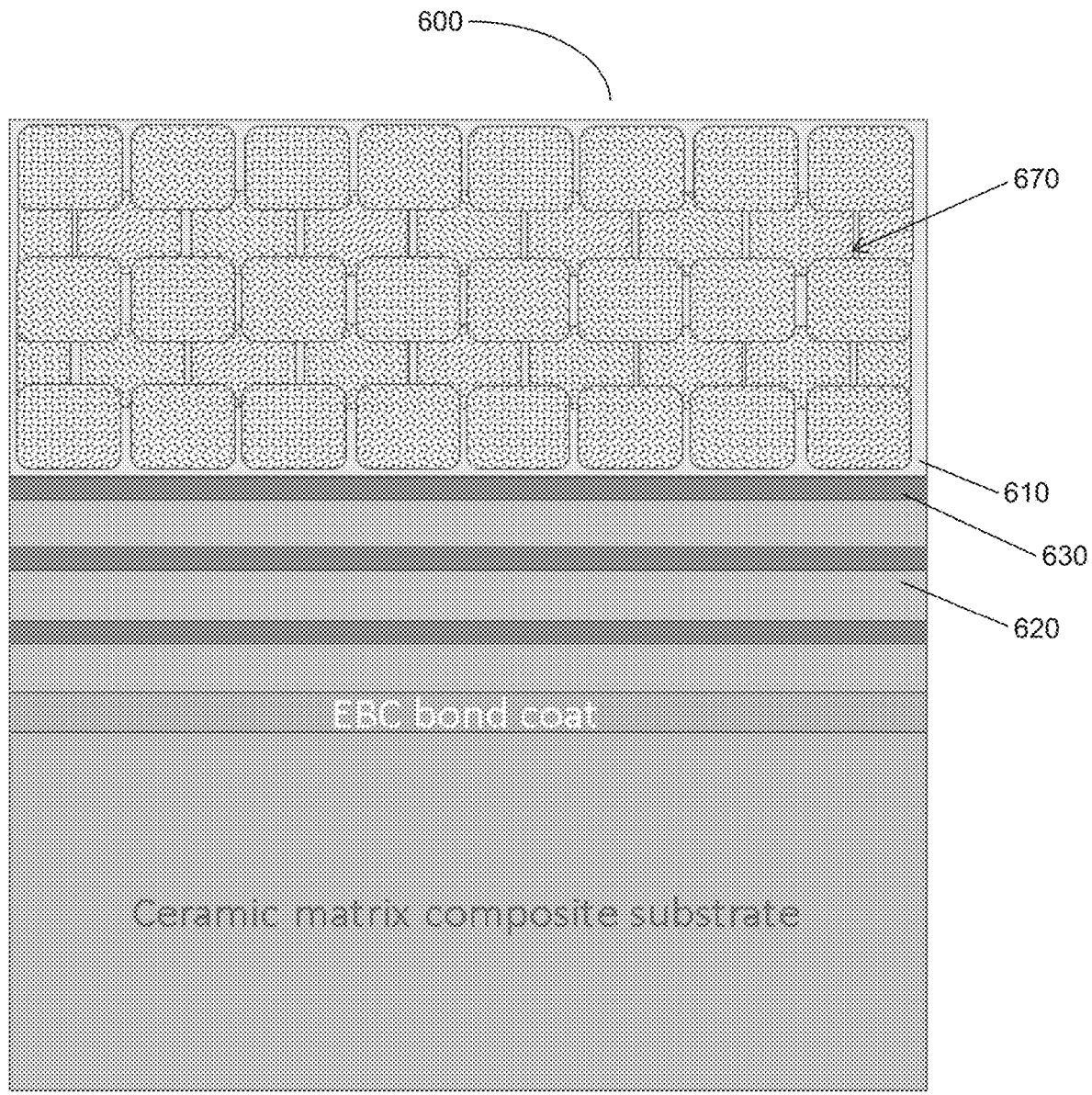
FIG. 6 is a diagram of a multicomponent EBC based on rare earth apatite based compositions according to an embodiment of the innovation.

FIG. 6 depicts an embodiment of alternating layered multicomponent EBC 600 with alternating RE Apatite layers 620 and rare earth silicate layers 630 for improved temperature capability, stability and CMAS resistance. In this embodiment, the multicomponent EBC comprises a top coat 610 comprising multicomponent $RE_{9.33}(SiO_4)_6O_2$ or $RE_{4.67}(SiO_4)_3O_2$ EBCs 670 with $(Hf,RE)_2Si_{2-x}O_{7-2x}$, and rare earth silicates grain boundary phases. The multicomponent EBC further comprises alternating layers of $RE_2Si_{2-x}O_{7-2x}$ layers 630 and multicomponent RE Apatite layers 620 of $RE_{9.33}(SiO_4)_6O_2$ or $RE_{4.67}(SiO_4)_3O_2$. In one embodiment, the multicomponent rare earth apatite based compositions may include RE Apatite silicates, or lanthnium apatite silicate compounds with chemical formula $RE_{10-x}(SiO_4)_6O_{2+Y}$ such as $RE_{9.33}(SiO_4)_6O_2$, and for lower atomic number rare earths, apatite compounds $RE_{4.67}(SiO_4)_3O_2$, and $RE_4(SiO_4)_6$,$RE_{14}Si_9O_{39}$ (i.e. $7RE_2O_3$-9$SiO_2$). In one embodiment, the EBC may further include an EBC bond coat and a ceramic matrix composite substrate.

Figure 7:
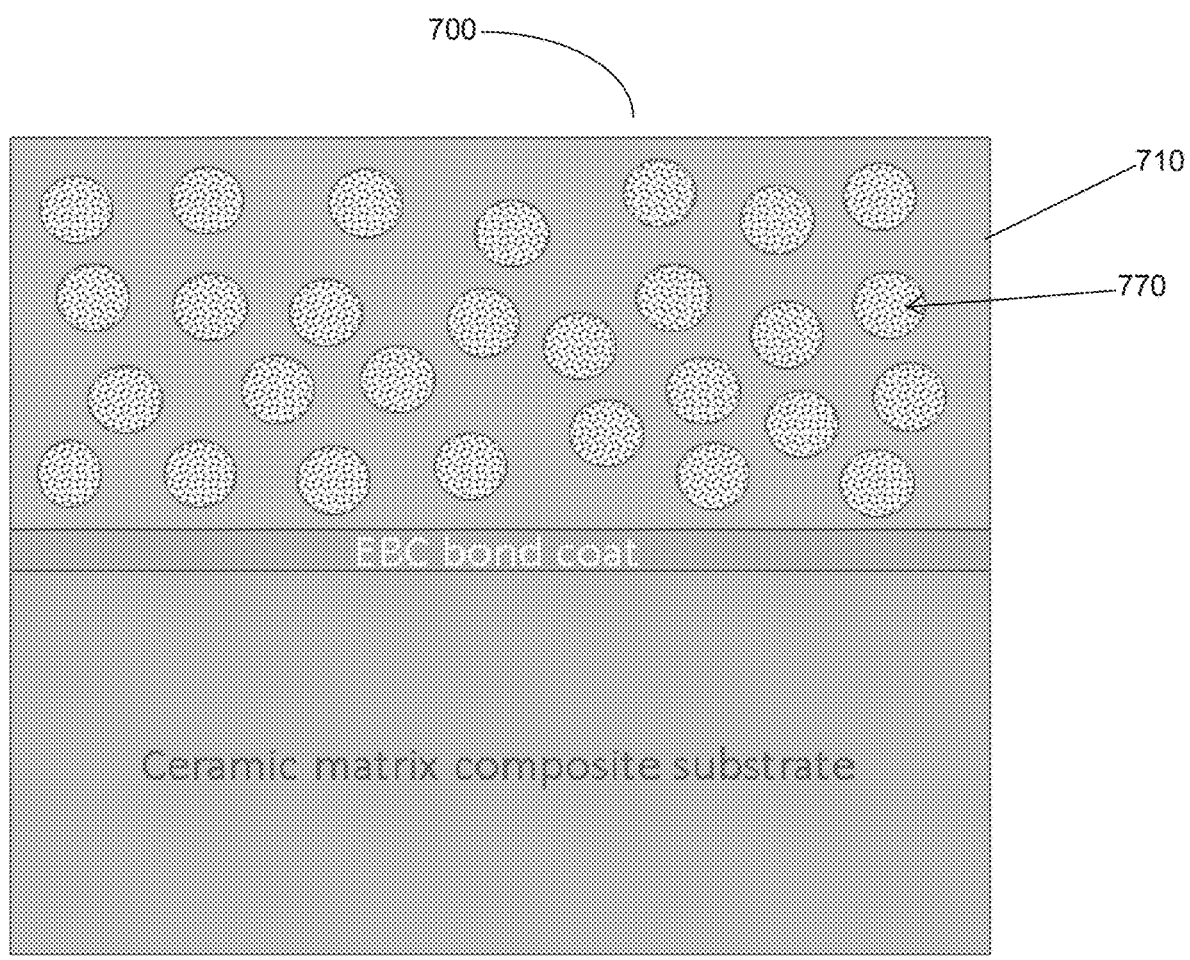
FIG. 7 is a diagram of a multicomponent EBC based on rare earth apatite based compositions according to an embodiment of the innovation.

FIG. 7 depicts an embodiment of a multicomponent EBC 700 based on rare earth apatite based compositions for improved temperature capability, stability and CMAS resistance. The multicomponent EBC comprises multicomponent rare earth apatite based compositions 710 for EBCs with apatite clusters 770 for improved temperature capability and CMAS resistance. The rare earth apatite compositions 710 can be doped with Hf, Zr, Ti, Ta, Ca, Al, Sr dopants. In one embodiment, the multicomponent rare earth apatite based compositions may include RE Apatite silicates, or lanthnium apatite silicate compounds with chemical formula $RE_{10-x}(SiO_4)_6O_{2+Y}$ such as $RE_{9.33}(SiO_4)_6O_2$, and for lower atomic number rare earths, apatite compounds $RE_{4.67}(SiO_4)_3O_2$, and $RE_4(SiO_4)_6$, $RE_{14}Si_9O_{39}$ (i.e. $7RE_2O_3$-$9SiO_2$). In one embodiment, the EBC may further include an EBC bond coat and a ceramic matrix composite substrate.

Figure 8:
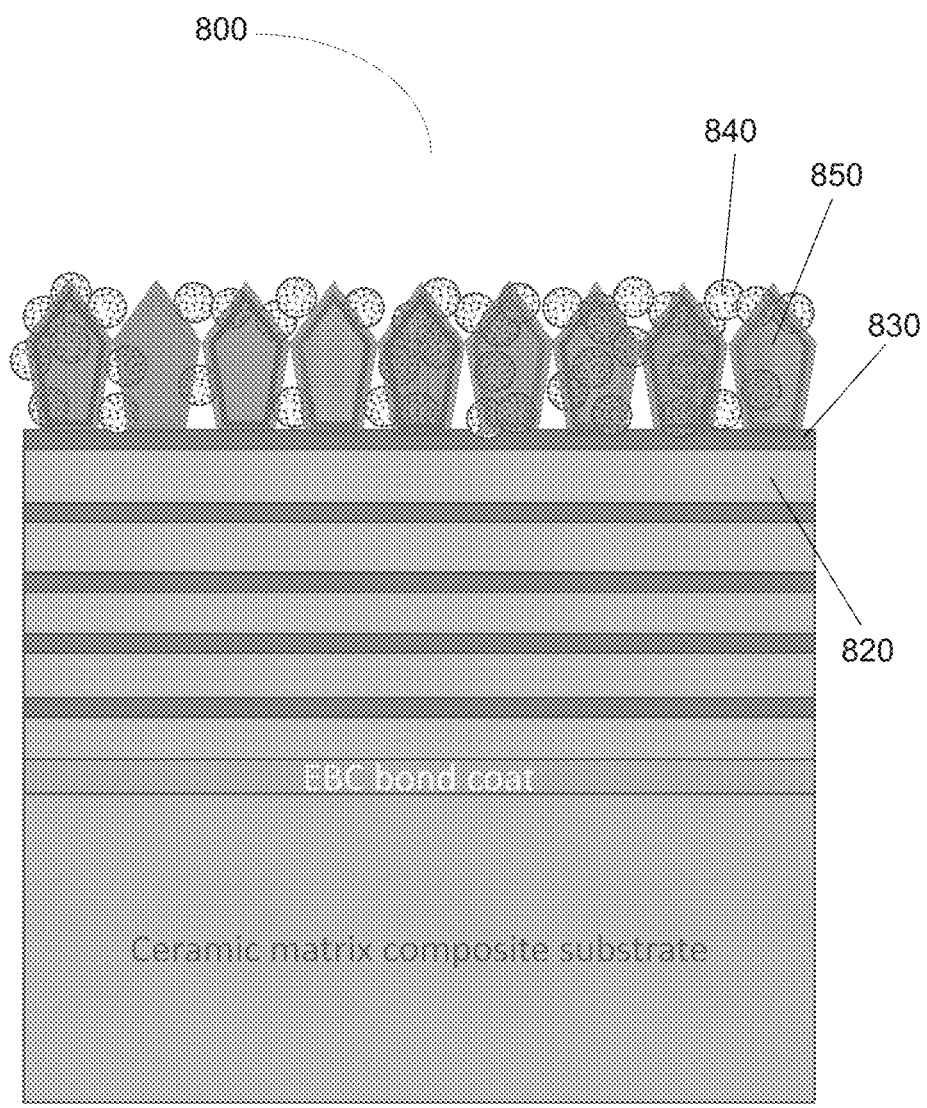
FIG. 8 is a diagram of a multicomponent EBC based on rare earth apatite based compositions according to an embodiment of the innovation.

FIG. 8 depicts an embodiment of an alternating layered multicomponent EBC 800 according to the innovation. FIG. 8 depicts multicomponent rare earth apatite silicate 840 and $(Hf,RE)_2Si_{2-x}O_{7-2x}$ 850 layer. This structure provides high temperature stability and CMAS resistance. The multicomponent RE apatite surface 850 having intercolumnar and grain boundary phases provide CMAS replant and resistance capabilities because the unique apatite surface combined micro- and nano-structure features. The multicomponent EBC may further include alternating layers of a multicomponent $RE_2Si_{2-x}O_{7-2x}$ layer 830 and a multicomponent RE Apatite layer 820 having the formula $RE_{9.33}(SiO_4)_6O_2$ or $RE_{4.67}(SiO_4)_3O_2$. 820 In one embodiment, the multicomponent rare earth apatite based compositions may include RE Apatite silicates, or lanthnium apatite silicate compounds with chemical formula $RE_{10-x}(SiO_4)_6O_{2+Y}$ such as $RE_{9.33}(SiO_4)_6O_2$, and for lower atomic number rare earths, apatite compounds $RE_{4.67}(SiO_4)_3O_2$, and $RE_4(SiO_4)_6$, $RE_{14}Si_9O_{39}$ (i.e. $7RE_2O_3$-$9SiO_2$). In one embodiment, the EBC may further include an EBC bond coat and a ceramic matrix composite substrate.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An environmental barrier coating system comprising a multicomponent rare earth apatite composition comprising a rare earth apatite silicate comprising $RE_2O_3$-10 mol%$SiO_2$ to $RE_2O_3$-75 mol%$SiO_2$; and
a multicomponent $(Hf,RE)_2Si_{2-x}O_{7-2x}$ top coat and alternating layers of a multicomponent $(Hf,RE)_2Si_{2-x}O_{7-2x}$ and the multicomponent rare earth apatite composition.

2. The environmental barrier coating system of claim 1, wherein the rare earth apatite silicate comprises a composition $RE_2O_3$-50 mol%$SiO_2$ to $RE_2O_3$-66.7 mol%$SiO_2$.

3. The environmental barrier coating system of claim 2, where the rare earth apatite silicate comprises $RE_{10-x}(SiO_4)_6O_{2+y}$.

4. The environmental barrier coating system of claim 3, wherein the rare earth apatite silicate comprises $RE_{9.33}(SiO_4)_6O_2$.

5. The environmental barrier coating system of claim 3, wherein the rare earth apatite silicate comprises $RE_{4.67}(SiO_4)_3O_2$.

6. The environmental barrier coating system of claim 1, wherein the rare earth element of the rare earth apatite silicate is selected from ytterbium, gadolinium, neodymium, samarium, lutetium, erbium, europium, terbium, dysprosium, holmium, lanthanum, cerium, praseodymium, promethium, thulium, yttrium, scandium, or a combination of two or more thereof.

7. The environmental barrier coating system of claim 1, wherein the rare earth apatite silicate comprises $(Nd,Yb,Gd,Sm)_{10}Si_6O_{27}$, $Nd_9YbSi_6O_{27}$, $Sm_9YbSi_6O_{27}$, $Gd_9YbSi_6O_{27}$, or $La_9YbSi_6O_{27}$.

8. The environmental barrier coating system of claim 1, wherein the multicomponent rare earth apatite surface has inter-columnar and grain-boundary phases.

9. The environmental barrier coating system of claim 1, wherein the multicomponent $(Hf,RE)_2Si_{2-x}O_{7-2x}$ top coat has embedded rare earth apatite clusters comprising $RE_{9.33}(SiO_4)_6O_2$.

10. The environmental barrier coating system of claim 1, comprising:
a multicomponent rare earth apatite composition comprising a rare earth apatite silicate comprising $RE_2O_3$-10 mol%$SiO_2$ to $RE_2O_3$-75 mol%$SiO_2$; and
a top coat comprising a multicomponent $RE_{9.33}(SiO_4)_6O_2$ composition having $(Hf,RE)_2Si_{2-x}O_{7-2x}$ and rare earth silicates grain boundary phases.

11. The environmental barrier coating system of claim 1, wherein the multicomponent rare earth apatite composition further comprises apatite clusters.

12. The environmental barrier coating system of claim 1, wherein the multicomponent rare earth apatite composition is doped with a dopant selected from Hf, Zr, Ti, Ta, Ca, Al, Sr, or a combination of two or more thereof.

13. An environmental barrier coating system comprising:
a multicomponent $(Hf,RE)_2Si_{2-x}O_{7-2x}$ top coat;
a second EBC layer comprising a multicomponent rare earth apatite composition comprising a rare earth apatite silicate comprising $RE_2O_3$-10 mol%$SiO_2$ to $RE_2O_3$-75 mol%$SiO_2$; and
a bond coat layer adjacent to a ceramic substrate.

14. The environmental barrier coating system of claim 13, wherein the rare earth apatite silicate comprises a composition $RE_2O_3$-50 mol%$SiO_2$ to $RE_2O_3$-66.7 moL%$SiO_2$.

15. The environmental barrier coating system of claim 13, wherein the second EBC layer comprises alternating layers of a multicomponent $(Hf,RE)_2Si_{2-x}O_{7-2x}$ layer and the multicomponent rare earth apatite composition.

* * * * *